United States Patent [19]

Humphrey

[11] 4,355,725
[45] Oct. 26, 1982

[54] JOINT DEVICE FOR STACKING APPARATUS

[76] Inventor: Gerald A. Humphrey, Rte. 5, Box 798, Lake Geneva, Wis. 53149

[21] Appl. No.: 132,128

[22] Filed: Mar. 20, 1980

[51] Int. Cl.³ .............................................. A47F 7/00
[52] U.S. Cl. .................................. 211/49 R; 211/182; 211/189; 403/205
[58] Field of Search ...................... 211/182, 49 R, 183, 211/189; 403/205, 403, 187, 188, 217, 300, 305, 382

[56] References Cited

U.S. PATENT DOCUMENTS

| | | | |
|---|---|---|---|
| 1,848,085 | 3/1932 | Eisenschmidt | 403/187 |
| 2,879,087 | 3/1959 | Haglund | 403/217 |
| 3,392,947 | 7/1968 | Keuehor | 403/187 X |
| 3,462,021 | 8/1969 | Hawke et al. | 211/182 |
| 3,467,418 | 9/1969 | Redditt | 403/188 X |

FOREIGN PATENT DOCUMENTS 800559 11/1950 Fed. Rep. of Germany .... 211/49 R

*Primary Examiner*—Ramon S. Britts
*Attorney, Agent, or Firm*—Andrus, Sceales, Starke & Sawall

[57] ABSTRACT

A joint device has a first tubular element suitable for receiving a horizontal member on which firewood is stacked. A second tubular element, joined to the first receives a vertical member for retaining the firewood.

4 Claims, 3 Drawing Figures

JOINT DEVICE FOR STACKING APPARATUS

As more and more people use firewood as fuel, attendant storage problems arise. Normally firewood is stored in stacks in sheds, garages, or basements. However, there are limits to the compactness by which firewood may be stored in an unrestrained manner that leads to problems as the amount of firewood stored increases. It is, therefore, the object of the present invention to provide a simple and economical means for compactly storing firewood.

The present invention contemplates a joint device for joining a pair of elongated members such as 2×4's so they extend at right angles to each other. The device comprises a first tubular element, of rectangular cross-section suitable for receiving a horizontal member on which the firewood is stacked. A second tubular element of rectangular cross-section is secured to a side of the first member for receiving a vertical member that retains the firewood in the stack. The elements are joined to present at least one flush exterior planar surface as by joining the elements side-by-side or by joining the smaller surface of one element to the larger surface of the other element. A pair of side-by-side horizontal and vertical members are preferably used in stacking the wood.

Figure 1:
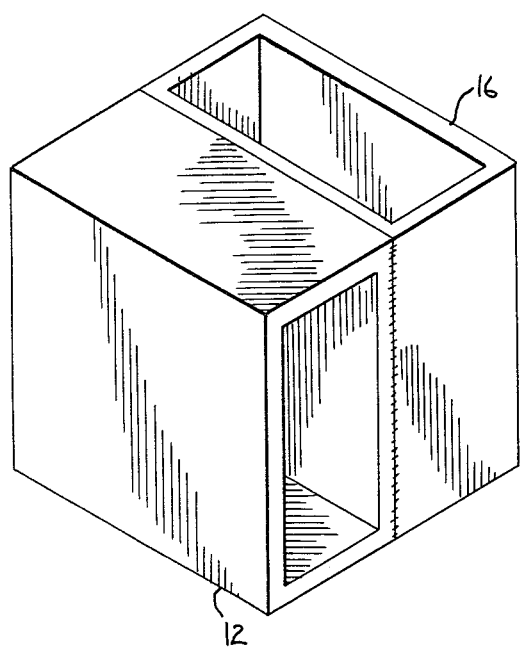
FIG. 1 is a perspective view of one embodiment of the present invention.
Figure 2:
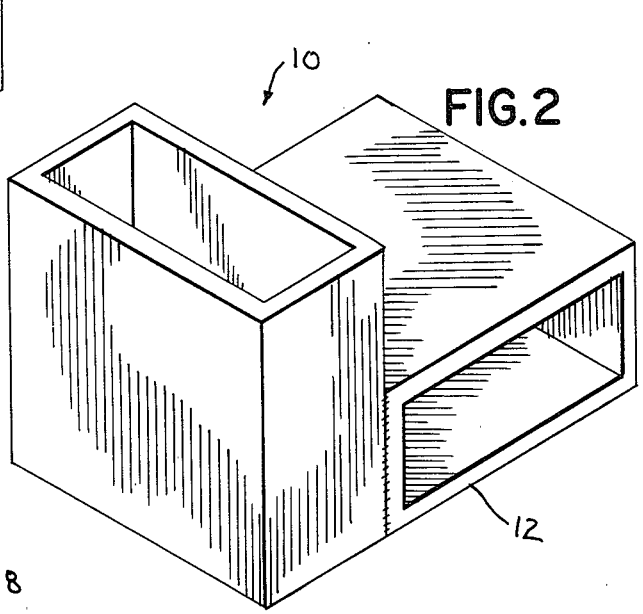
FIG. 2 is a perspective view of the second embodiment of the present invention.
Figure 3:
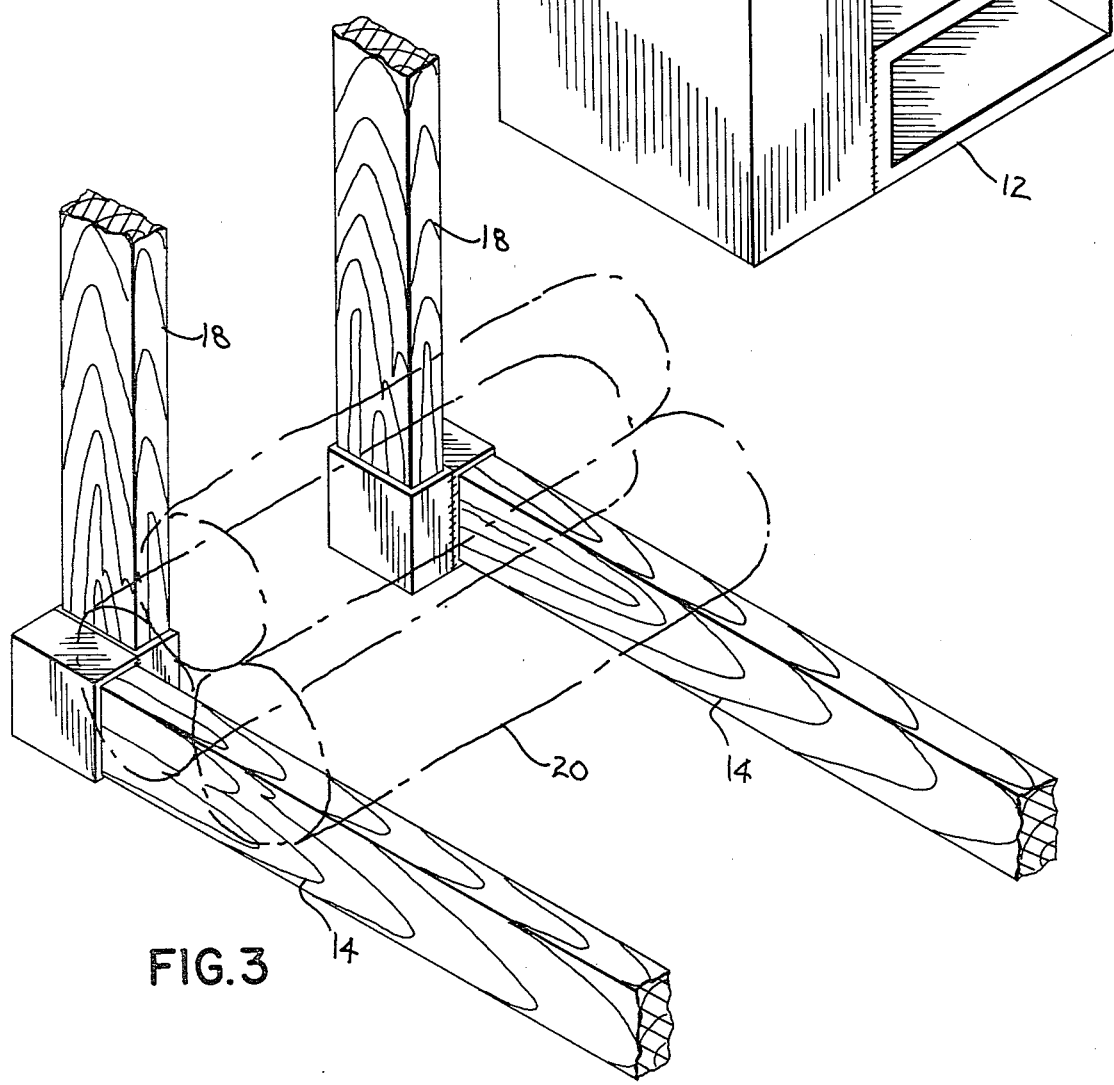
FIG. 3 is a partial perspective view showing the embodiment of FIG. 1 in use to stack firewood.

The joint device of the present invention is indicated by numeral 10 in FIG. 1. Joint device 10 includes a first tubular element 12 of rectangular cross-section. As shown in FIG. 3, tubular element 12 receives an elongated member 14, typically an economical and easily available member, such as a 2×4 timber. The cross-section configuration of element 12 is sized accordingly and the length of element 12 is such as to obtain the desired amount of engagement with member 14. A second tubular element 16 which preferably is identical to tubular element 12 in configuration, is fastened to the side of tubular element 12 to receive vertical member 18, as shown in FIG. 3. Second tubular element 16 and first element 12 may be fastened together along their larger sides, as shown in FIG. 1 to provide a joint device 10 of convenient and compact rectangular parallelepipedal configuration. Or, second element 16 may be joined to first element 12 along the smaller surface of the latter to provide the joint device 10 with improved stability.

In use, a joint device 10 is placed at each end of a pair of spaced horizontal members 14, by means of first elements 12. Vertical members 18 are inserted in second elements 16. The firewood 20 in then stacked on horizontal members 14, giving them stability against dislodgement or tipping while permitting air to circulate under the firewood. Firewood 20 may be stacked against vertical members 18 providing a compact stack of wood.

When not in use, the apparatus may be easily disassembled because of its knock down capability and conveniently stored by virtue of its compact construction.

Various modes of carrying out the invention are contemplated as being within the scope of the following claims particularly pointing out and distinctly claiming the subject matter which is regarded as the invention.

I claim:
1. Apparatus for stacking firewood adjacent the ground comprising:
  a pair of spaced elongated horizontal members of rectangular cross-section configuration positionable adjacent the ground and on which firewood is stacked to provide stability to said members;
  a joint device at the end of each of said spaced elongated members, said joint device consisting of a first tubular element having a rectangular cross-section receiving said horizontal member and a second tubular member secured to the side of said first tubular member and having a rectangular cross-section receiving a vertical member, said first and second elements being so joined as to present at least one flush exterior planar surface abuttable with the ground.

2. The apparatus according to claim 1 wherein said first and second tubular elements of said joint devices consist of a pair of large surfaces and a pair of small surfaces wherein said members are secured along said large surfaces so that all exterior planar surfaces are flush.

3. The apparatus according to claim 1 wherein said first and second tubular elements of said joint devices consist of a pair of large surfaces and a pair of small surfaces and wherein said elements are secured along the large surface of one of said elements and the small surface of the other of said elements.

4. The apparatus according to claim 1 wherein said first and second tubular elements of said joint devices are identical in construction.

* * * * *